| threading quartz strands through helix and tubular lead outs |

| threading ends of helix through transverse holes of lead outs |

| crimping lead outs to helix ends |

| draw on woven insulating sleeve over helix and lead outs |

| draw down metal tube onto sleeve |

United States Patent Office
3,546,654
Patented Dec. 8, 1970

3,546,654
ELECTRICAL RESISTANCE ELEMENTS
AND METHOD OF MAKING
Barry Rogal and William Henry Bales, Bognor Regis, England, assignors to Rosemount Engineering Company Limited, Bognor Regis, England, a British company
Filed Feb. 24, 1969, Ser. No. 801,549
Int. Cl. H01c 1/02
U.S. Cl. 338—268
15 Claims

ABSTRACT OF THE DISCLOSURE

A helical electrical resistance element assembly has at least one strand of insulating fibre, e.g. quartz, passing through the helical element and through tubular lead-outs which are crimped to grip the strand and to secure them to the wire which is threaded through transverse holes in the lead-outs. A woven insulating sleeve, e.g. of quartz, is drawn over the helical element and lead-outs and then a metal tube is drawn down onto the insulating sleeve.

BACKGROUND OF THE INVENTION

Field of the disclosure

This invention relates to helical electrical resistance elements. It is applicable for example to helical heating elements but finds particular use for resistance thermometers e.g. platinum resistance thermometers for high temperature measurements.

Description of the prior art

One of the problems with platinum resistance thermometers using a helical resistance element is the connection of the element to lead-outs. It is usual to fuse or braze the helical platinum wire to connectors at each end of the wire and, as a result of the high temperature at which these operations are to be carried out, the ends of the helix become mechanically weak. This problem is particularly aggravated in an arrangement in which the helical element is put within a sleeve of woven insulating material, for example quartz, so that a metal tube may be drawn down onto the helix to form a resistance thermometer unit of uniform outside diameter. When a metal tube is drawn onto the element, the helix tends to stretch in a non-uniform manner during the drawing process particularly when the drawing die is passing over the regions containing the junctions between the lead-out connections and the helix. The last few turns of the helix tend to be extended more than the remainder and this results in a weakened construction and incomplete support for the helical element.

SUMMARY OF THE INVENTION

According to one aspect of the present invention, a method of making a helical resistance element assembly comprises the steps of passing a strand or strands of insulating material through a helical resistance element and through tubular lead-outs at each end of the element, and then crimping the tubular lead-outs to secure them to the ends of the helical wires with deformation of the lead-outs such as to grip the insulating strand or strands. The aforementioned strand or strands are conveniently of glass or quartz and they serve to prevent any stretching of the helix. With this method of making a resistance assembling using a strand or strands of insulating material in the helical element, the helical element cannot be unduly extended in any subsequent operation, e.g. if a sleeve is subsequently drawn over the assembly. Conveniently the strand or strands are taut so that no extension is possible but this is not essential provided the helical element is not unduly extended when the strand or strands are pulled taut. This technique is particularly applicable if the lead-outs and helix are to be covered by a woven insulating sleeve and a metal tube is drawn down onto the insulating sleeve. This insulating sleeve is conveniently formed of quartz which is drawn over the resistance element and lead-outs. A thin metal tube may then be drawn down onto the sleeve. In the case of a platinum resistance thermometer, the metal tube may also be formed of platinum or may be of nickel.

The invention furthermore includes within its scope an electrical resistance element assembly comprising a helical wire with tubular lead-out connections one at each end of the wire, an insulating strand or strands passing through the tubular lead-out connections and through the helical wire, the tubular lead-outs being crimped to secure them to the ends of the wire with deformation of the tubular lead-out so as to grip the insulating strand or strands. As indicated above a woven insulating sleeve, typically of quartz, may be provided over the helix and lead-out connections. A metal tube may then be drawn down onto the woven sleeve.

The tubular lead-outs are preferably made to be as closely as possible of the same diameter as the helix.

Preferably the wire at each end of the helix is arranged to pass through two or more transverse holes in each lead-out tube; conveniently the wire is threaded through these holes. The wire is thus firmly held and is cold-welded to the tube by the crimping operation.

DESCRIPTION OF THE PREFERRED EMBODIMENT

Figure 1:
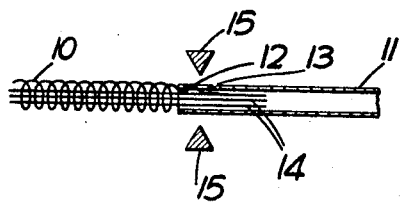
FIG. 1 is a diagram illustrating one end of a helical wire; a lead-out tube before crimping and, FIG. 2 is a diagram to illustrate a woven sleeve and outer sheath over the element.

Referring to FIG. 1 there is shown one end of a helical resistance element 10 and a tubular lead-out 11. The lead-out is of low electrical resistance. For a resistance thermometer both the wire 10 and lead-out 11 would typically be of platinum. The lead-out 11 has a number of drilled holes such as 12 and 13 and the end of the wire is threaded through these holes. A number of quartz fibres, such as the fibres 14, extend tautly through the helix and into the lead-out tube 11. The tube 11 is then crimped as indicated by the diagrammatic crimping elements 15. This causes cold welding of the wire 10 to the tube 11 and also makes the tube 11 grip the quartz strands 14. It will be noted that the lead-out tube 11 is of substantially the same diameter as the helix 10. After the ends of the wire 10 have been secured to the lead-out tubes 11, a woven silica sleeve 16 is drawn over the assembly and then an outer metal tube 17, usually of nickel or platinum, is drawn down onto the woven sleeve 16 to form an element of uniform external diameter.

Figure 2:
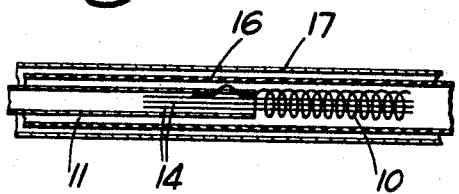
Figures 3, 4:
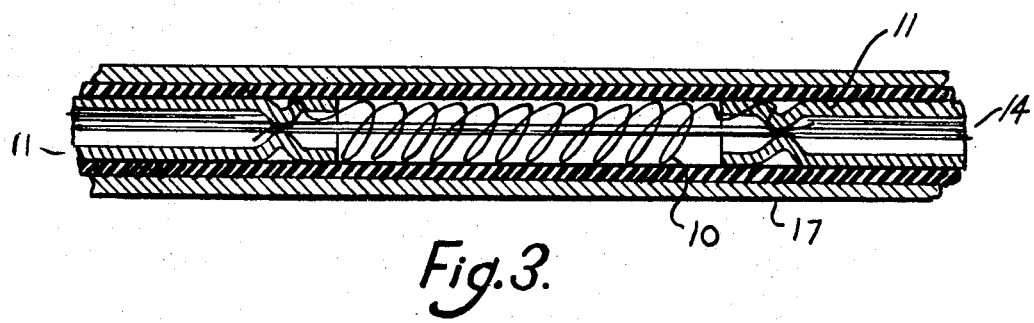
FIG. 3 is a diagrammatic illustration of the completed article having insulating strands through the lead outs.
FIG. 4 is a flow chart showing the method of the invention.

The construction illustrated in FIGS. 1 and 2 finds particular application for resistance thermometers which are liable to severe vibration, e.g. thermometers for aero engine jet pipe temperature measurement.

We claim:
1. A method of making a helical resistance element assembly comprising the steps of passing at least one strand of insulating material through a helical resistance element and into tubular lead-outs at each end of the element, and then crimping the tubular lead-outs to secure them to the ends of the helical wire with deformation of the lead-outs such as to grip the insulating strand.

2. A method as claimed in claim 1 wherein said strand is stretched taut.

3. A method as claimed in claim 1 wherein the lead-outs are metal tubes of substantially the same diameter as the helix formed by the resistance element.

4. A method as claimed in claim 1 wherein said strand is of glass or quartz.

5. A method as claimed in claim 1 wherein the helix and at least part of the lead-outs are covered by a woven insulating sleeve and wherein a metal tube is drawn down onto the insulating sleeve.

6. A method as claimed in claim 5 wherein the insulating sleeve is of quartz.

7. An electrical resistance element assembly comprising a helical wire with tubular lead-out connections one at each end of the wire, at least one insulating strand passing into the tubular lead-out connections and through the helical wire, the tubular lead-outs being crimped to secure them to the ends of the wire with deformation of the tubular lead-out so as to grip the insulating strand.

8. An electrical resistance element assembly as claimed in claim 7 wherein said strand is stretched taut.

9. An electrical resistance element assembly as claimed in claim 7 and having a woven insulating sleeve over the helix and lead-out connections.

10. An electrical resistance element assembly as claimed in claim 9 wherein the woven insulating sleeve is of quartz.

11. An electrical resistance element assembly as claimed in claim 9 and having a metal tube drawn down onto the woven sleeve.

12. An electrical resistance element assembly as claimed in claim 7 wherein said strand is of quartz.

13. An electrical resistance element assembly as claimed in claim 7 wherein the tubular lead-outs are of substantially the same diameter as the helix.

14. An electrical resistance element assembly as claimed in claim 7 wherein each end of the wire is threaded through two or more transverse holes in the tubular lead-out.

15. An electrical resistance element assembly comprising a helical resistance wire with tubular lead-outs, one at each end of the wire, said tubular lead-outs each having at least one transverse hole, at least one strand of insulating material passing through the helical wire, and the tubular lead-outs, said wire being threaded through the transverse hole and the lead-outs being crimped to be secured to ends of the wire with deformation of the lead-outs so as to grip said strand, a woven insulating sleeve drawn over the helix and lead-outs and a metal tube drawn down onto the woven sleeve.

References Cited
UNITED STATES PATENTS 1,463,005    7/1923    Dalton _____ 338—268

ELLIOT GOLDBERG, Primary Examiner

U.S. Cl. X.R.

29—613, 619; 174—94; 338—332

PO-1050
(5/69)

UNITED STATES PATENT OFFICE
CERTIFICATE OF CORRECTION

Patent No. 3,546,654      Dated February 9, 1971

Inventor(s) Barry Rogal et al

It is certified that error appears in the above-identified patent and that said Letters Patent are hereby corrected as shown below:

Column 4, line 23 after completed Claim 15, insert --Claim 16. An electrical resistance assembly as claimed in Claim 7 wherein said strand extends through the tubular lead-out connections.-- as per Amendment dated June 26, 1970.

In the heading to the printed specification, line 10, "15 Claims" should read -- 16 Claims --.

Signed and sealed this 13th day of April 1971.

(SEAL)
Attest:

EDWARD M. FLETCHER, JR.      WILLIAM E. SCHUYLER
Attesting Officer      Commissioner of Pat（